US012593840B2

(12) United States Patent
Knapp et al.

(10) Patent No.: US 12,593,840 B2
(45) Date of Patent: Apr. 7, 2026

(54) PESTICIDAL OR REPELLANT COMPOSITION AND METHOD OF USE

(71) Applicant: OPTIMALLY BALANCED CORP, Boynton Beach, FL (US)

(72) Inventors: Andrew C Knapp, Boynton Beach, FL (US); Deirdre M Knapp, Boynton Beach, FL (US); William H Dippert, Boynton Beach, FL (US)

(73) Assignee: Optimally Balanced Corp., Boynton Beach, FL (US)

( * ) Notice: Subject to any disclaimer, the term of this patent is extended or adjusted under 35 U.S.C. 154(b) by 0 days.

(21) Appl. No.: 18/158,583

(22) Filed: Jan. 24, 2023

(65) Prior Publication Data

US 2023/0232824 A1     Jul. 27, 2023

Related U.S. Application Data

(60) Provisional application No. 63/302,162, filed on Jan. 24, 2022.

(51) Int. Cl.

| | |
|---|---|
| *A01N 31/14* | (2006.01) |
| *A01N 25/14* | (2006.01) |
| *A01N 25/26* | (2006.01) |
| *A01N 65/18* | (2009.01) |
| *A01N 65/22* | (2009.01) |
| *A01N 65/24* | (2009.01) |
| *A01N 65/44* | (2009.01) |
| *A01P 17/00* | (2006.01) |

(52) U.S. Cl.
CPC ............. *A01N 31/14* (2013.01); *A01N 25/14* (2013.01); *A01N 25/26* (2013.01); *A01N 65/18* (2013.01); *A01N 65/22* (2013.01); *A01N 65/24* (2013.01); *A01N 65/44* (2013.01); *A01P 17/00* (2021.08)

(58) Field of Classification Search
CPC ........ A01N 31/14; A01N 25/14; A01N 25/26; A01N 65/18; A01N 65/22; A01N 65/24; A01N 65/44; A01N 31/16; A01P 17/00
See application file for complete search history.

(56) References Cited

U.S. PATENT DOCUMENTS

| | | | |
|---|---|---|---|
| 5,716,602 | A | 2/1998 | Uick |
| 6,171,608 | B1 | 1/2001 | Schmitt et al. |
| 6,183,765 | B1 | 2/2001 | Kalder et al. |
| 6,991,809 | B2 | 1/2006 | Anderson |
| 7,019,036 | B2 | 3/2006 | Hiromoto |
| 7,235,261 | B2 | 6/2007 | Smith et al. |
| 7,348,035 | B2 | 3/2008 | Schleifenbaum et al. |
| 7,351,739 | B2 | 4/2008 | Ho et al. |
| 7,452,917 | B2 | 11/2008 | Baumoeller et al. |
| 7,514,102 | B1 | 4/2009 | Overman |
| 7,846,464 | B2 | 12/2010 | Darling |
| 7,858,127 | B2 | 12/2010 | Overman |
| 8,062,676 | B2 | 11/2011 | Besendorfer |
| 8,231,887 | B2 | 7/2012 | Sims |
| 8,287,919 | B2 | 10/2012 | Davis |
| 8,296,993 | B2 | 10/2012 | Modlin et al. |
| 8,323,697 | B2 | 12/2012 | Rosenfeldt et al. |
| 8,691,256 | B2 | 4/2014 | Enan |
| 8,734,869 | B2 | 5/2014 | Enan |
| 8,962,694 | B2 | 2/2015 | Dall et al. |
| 8,968,798 | B2 | 3/2015 | Green et al. |
| 9,028,856 | B2 | 5/2015 | Reid et al. |
| 9,247,751 | B2 | 2/2016 | Bessette et al. |
| 9,288,980 | B2 | 3/2016 | Davis |
| 9,326,524 | B1 | 5/2016 | Jack et al. |
| 9,414,997 | B2 | 8/2016 | Jones et al. |
| 9,572,348 | B2 | 2/2017 | Messina |
| 9,610,228 | B2 | 4/2017 | Sasaki et al. |
| 9,635,858 | B2 | 5/2017 | Newberry et al. |
| 9,743,676 | B2 | 8/2017 | O'Connor |
| 9,937,109 | B2 | 4/2018 | Ferguson et al. |
| 10,010,506 | B2 | 7/2018 | Smith et al. |
| 10,045,551 | B2 | 8/2018 | Hoelscher et al. |
| 10,051,864 | B2 | 8/2018 | Stoller et al. |
| 10,081,641 | B2 | 9/2018 | Stoller et al. |
| 10,098,098 | B2 | 10/2018 | Man et al. |
| 10,104,884 | B2 | 10/2018 | Kijlstra et al. |
| 10,174,275 | B2 | 1/2019 | Last |
| 10,212,931 | B2 | 2/2019 | Wood et al. |
| 10,308,650 | B2 | 6/2019 | Jung et al. |
| 10,321,681 | B2 | 6/2019 | Grobler |
| 10,334,856 | B2 | 7/2019 | Dale et al. |
| 10,342,748 | B2 | 7/2019 | Droege et al. |
| 10,537,503 | B2 | 1/2020 | Lei et al. |
| 10,555,879 | B2 | 2/2020 | Lei et al. |
| 10,595,529 | B1 | 3/2020 | Enan |
| 10,785,977 | B2 | 9/2020 | Vandock et al. |
| 10,835,885 | B2 | 11/2020 | Rost et al. |
| 10,881,104 | B2 | 1/2021 | Kennedy et al. |
| 10,961,248 | B2 | 3/2021 | Edmunds et al. |
| 10,966,927 | B2 | 4/2021 | Burnam |
| 10,973,935 | B2 | 4/2021 | Exner et al. |
| 2004/0201117 | A1* | 10/2004 | Anderson ............ A61K 9/5015 264/4.6 |
| 2010/0272818 | A1* | 10/2010 | Franklin ................ A01N 31/14 424/490 |
| 2015/0359230 | A1* | 12/2015 | Messina ................ A01N 65/40 424/731 |
| 2023/0042086 | A1* | 2/2023 | Calderas ................ A01N 25/04 |

FOREIGN PATENT DOCUMENTS

| | | | | |
|---|---|---|---|---|
| CN | 102596187 A | * | 7/2012 | ............ A01N 31/08 |
| WO | WO-2017170362 A1 | * | 10/2017 | ............ A01M 29/12 |

OTHER PUBLICATIONS

CN-102596187-A Translation (Year: 2012).*

* cited by examiner

*Primary Examiner* — Snigdha Maewall

(57) ABSTRACT

A composition for managing, controlling, neutralizing, killing, or repelling an amphibian or reptile comprises at least one active ingredient comprising an effective amount of thymol or a derivative thereof and an effective amount of eugenol or a derivative thereof. The composition is also useful for protecting, guarding, or repelling a pet.

11 Claims, 3 Drawing Sheets

PESTICIDAL OR REPELLANT COMPOSITION AND METHOD OF USE

CROSS-REFERENCE TO RELATED PATENT APPLICATION

This patent application is based upon and claims the priority of commonly assigned U.S. Provisional Patent Application Ser. No. 63/302,162, filed Jan. 24, 2022, incorporated herein by reference.

FIELD OF THE INVENTION

The present invention relates to a repellant or pesticidal composition for use on invasive or non-invasive amphibians or reptiles and methods of use. More particularly, the invention relates to a repellant or pesticidal composition for use with respect to invasive or non-invasive amphibians or reptiles that can be applied either directly to a target pest or to a wide range of surfaces and substrates.

BACKGROUND OF THE INVENTION

Invasive amphibians and reptiles are an increasing problem across the United States and across the globe. They can have a significant impact on ecosystems and environments through predation on native species and competition with native species for limited resources. More particularly, invasive amphibians and reptiles can quickly decimate native populations and start chain reactions that lead to permanent change or even collapse of established ecosystems.

Some species pose a significant threat to agriculture from crop destruction, from increased predation of pollinators, and/or from damage to, or poisoning of, livestock. Some amphibians and reptiles present public health and safety issues by causing damage to infrastructure, including, but not limited to, by causing contamination at water treatment facilities, by damaging power transfer stations and lines, or by damaging waste treatment and sanitation systems. At the individual level, amphibians and reptiles cause damage to personal property; injure, damage, or even kill pets; pose a threat to human health; and negatively affect the quality of life.

A number of invasive or non-invasive amphibians and reptiles are considered to be pest organisms, that is, each of these species has significant impact in areas they infest. The cane toad (*Rhinella marina* or *Bufo marinus*), also known as the *bufo*, giant, or marine toad, is a large, terrestrial amphibian indigenous to much of South America and north through Central America and Mexico. Cane toads have enlarged pteroid glands behind the eyes which secrete bufagenins and bufotoxins (together "bufotoxin"), a toxic combination of cardioactive steroids and neurotoxins. Bufotoxin is used as a defense against predators, including domestic pets. The effect of bufotoxin's action is described as digitalis-like, often resulting in ventricular fibrillation. The common clinical signs are related to the cardio-vascular system and/or the central nervous system (CNS). Cane toad adults, juveniles, and tadpoles and the eggs of cane toads contain toxic levels of bufotoxin.

The cane toad is a significant pest in the U.S., Australia, and various Pacific, Asian, and Caribbean locations.

Cane toads have a severe impact on wildlife population as their toxin will typically kill most predators. Because they have a high level of toxicity in all their life stages, from egg to tadpole to adult, cane toads impact a large variety of predators in several aspects of the ecosystem. By reduction of the population of these predators, other species, such as some turtles, have been released from predative and competitive pressure and have subsequently experienced an increase in population. Other predators actively avoid consuming cane toads, their eggs, or their tadpoles and may therefore lose out on feeding opportunities. Potential fish predators of cane toad eggs and tadpoles rapidly learned to avoid eating the cane toad eggs and tadpoles since the potential fish predators may die if they do eat them. Simply adding cane toad corpses to ponds has proven fatal to native tadpoles, fish, and leeches.

There is a high degree of dietary overlap between cane toads and native Southern toads (*Anaxyrus terrestris*) in Florida, suggesting competition for nutrients between these species. In some areas of Florida, the cane toad may displace the native Southern toad. Cane toad eggs can prove fatal to some North American amphibian tadpoles: Eastern Spadefoot Toad (*Scaphiopus holbrooki*), Southern Leopard Frog (*Lithobates sphenocephalus*), and Green Tree Frog (*Hyla cinerea*), as well as the Southern toad.

Cane toads are dangerous for more than just the toxins they exude or secrete. The nonindigenous tick, *Amblyomma rotundatum*, was introduced to Florida and Hawaii through parasitized cane toads, and the Common Dog Hookworm, *Aclyostoma caninum*, was found in the feces of cane toads from Tampa, Florida *Amblyomma rotundatum* is a tick that feeds on both reptiles and amphibians and can have deleterious effects on native reptiles and amphibians. This tick is also associated with lesions and deteriorated body condition in infected cane toads and is a vector for *Hemovilia stellate* (a blood parasite) and for *Rickettsia bellii* (some *Rickettsia* species have high potential for human and wildlife illness). Cane toads have been implicated in the infection of endemic frogs by a gallbladder parasite, *Myxidium immersum*. Cane toads can also spread the *Batrachochytrium dendrobatidis* fungus, which is devastating global amphibian populations.

Humans can become ill or even die from consuming cane toads or their eggs, and small children can become ill or even die from contact with bufotoxin. Cane toad toxicity scales with body size—larger toads are consequently much more toxic than smaller toads. Larger predators (large lizards, snakes, alligators, crocodiles, and mammals that tear apart prey) are therefore at greater risk of poisoning from cane toads. The bufotoxin secreted from cane toad glands can be squirted or transferred into human eyes when the cane toads are handled roughly, causing intense pain and a potential medical emergency. Also, cane toads are vectors of *Salmonella*, some varieties of which are pathogenetic to humans and wildlife.

In both the United States and Australia, the cane toad also has a detrimental impact on the "quality of life" in urban settings, where its presence in areas such as domestic yards and parkland areas poses a threat of poisoning to domestic pets. There is also a risk that children may be exposed to the bufotoxin. Cane toad fecal droppings are unsightly and annoying and potential sources of infection.

Another invasive pest of great concern is the Cuban treefrog (*Osteopilus septentrionalis*), which is native to Cuba, especially the Isle of Youth (an island province of Cuba also known as Isle of Pines), the Cayman Islands, and the Bahamas. It is an introduced species in Florida, and the earliest confirmed records date to the 1920s in the Florida Keys. The first Cuban treefrogs in Florida likely arrived as stowaways in shipping crates originating from the Caribbean. By the mid-1970s they had dispersed throughout most of southern Florida. As of 2017, there were established breeding populations of Cuban treefrogs as far north as Cedar Key on Florida's Gulf Coast, Jacksonville on the Atlantic Coast, and Gainesville in north-central Florida. This species certainly has the potential to expand its range in Florida and the Southeast, and isolated individual Cuban treefrogs have been documented in coastal South Carolina, Georgia, Alabama, Mississippi, Louisiana, and Texas. The number of reports of Cuban treefrogs from the Florida panhandle continues to increase, and this invasive frog may already have small populations established in other regions of Florida. Cuban treefrogs spread by hitchhiking on ornamental plants, motorized vehicles, boats, etc. The Cuban treefrog is considered an invasive species in Florida.

Cuban treefrogs prey on native frogs, small lizards, and small snakes. Their tadpoles can out-compete native tadpoles for food or space and are thus believed to be causing the decline of native treefrogs. Cuban treefrog skin secretes a mucus that can irritate the eyes and nose, cause allergy-like symptoms, and even trigger asthma attacks; they breed loudly after midnight in pools, ponds, birdbaths, etc.; they invade toilets and can clog drains; and they invade power boxes and cause power outages.

As Cuban treefrog populations continue to expand, they are becoming a more significant economic issue. When they get into transformer boxes and electrical switches, they cause short circuits in disconnect switches, resulting in power outages, increased maintenance costs, and the added impact from power disruption. Similarly, they are becoming increasingly problematic for homeowners and municipalities as they continue to increase the costs for replacement and maintenance of water pumps, power transformers, and AC compressors, clogged pipes, and contaminate water and living spaces.

Other significant invasive or non-invasive amphibian and reptile pests in the United States include, but are not limited to, species such as the American bullfrog (*Lithobates catesbeiana*), the coqui frog (*Eleutherodactylus coqui*), Burmese pythons (*Python bivittatus*), the Argentine black and white tegus (*Salvator merianae*), boa constrictors (*Boa constrictor*), green and yellow anacondas (*Eunectes murinus, Eunectes notaeus*), brown treesnakes (*Boiga irregularis*), green iguanas (*Iguana iguana*), Nile monitors (*Varanus niloticus*), Mediterranean geckos (*Hemidactylus turcicus*), Northern curly-tailed lizards (*Leiocephalus carinatus*), and Brown anoles (*Anolis sagrei*).

"Humane" ways to repel or kill amphibians or reptiles are not available to most households because they involve toxic chemicals, restricted drugs, or poisons; require a degree of specialized training; or are too cumbersome or inefficient for most individual homeowners to use. Gassing and freezing are commonly used methods for killing amphibians; however, each has its drawbacks. A variety of broadly unacceptable "techniques", commonly involving physical violence, have been adopted, particularly for cane toad control. However, outcomes of these methods can be uncertain, and many people are uncomfortable with the use of violent means to repel or control pests. In addition, there are reports of persons being adversely affected by toad toxins or bitten by reptiles while attempting to kill the animals. In the case of cane toads, accidental exposure to their bufotoxin is due, in many cases, to the discharge or transfer of bufotoxin following physical and/or violent contact with the animal, and subsequent contact with and poisoning through the skin or mucosal surfaces.

It can be appreciated that a composition or method that makes it possible to repel and/or kill amphibians or reptiles such as cane toads and Cuban treefrogs in an acceptable timeframe, while providing convenience of use, would provide a valuable advance in efforts to manage the pests.

OBJECTS OF THE INVENTION

It is an object of the invention to provide a composition to control, neutralize, kill, or repel invasive and non-invasive amphibians or reptiles that is relatively safe to use and a method of using same.

It is also an object of the invention to provide a composition to control, neutralize, kill, or repel amphibians or reptiles that may be suitable for household use and which, in addition, removes the need for specialized equipment and/or training to apply.

It is a further object of the invention to provide a composition to control, neutralize, kill, or repel amphibians or reptiles that can be utilized in various application methods, including direct application to the target pest or application on a wide variety of surfaces.

It is a further object of the invention to provide, in the context of cane toad and/or Cuban treefrog control, a composition to control, neutralize, kill, or repel amphibians or reptiles that removes the risk of harm from exposure of the cane toad bufotoxin to those who would normally use physical means to control, neutralize, kill, or repel the pests.

It is a further object of the invention to provide a composition to control, neutralize, kill, or repel amphibians or reptiles that comprises an effective amount of thymol and an effective amount of eugenol.

It is a further object of the invention to provide a method of controlling, neutralizing, killing, or repelling pests such as amphibians or reptiles that comprises applying a composition to control, neutralize, kill, or repel amphibians or reptiles comprising an effective amount of thymol and an effective amount of eugenol.

It is a further object of the invention to provide a method of killing pests such as amphibians or reptiles that comprises applying a composition to kill amphibians or reptiles comprising an effective amount of thymol and an effective amount of eugenol.

It is a further object of the invention to provide a composition to protect, guard, or repel a pet from an amphibian or reptile, wherein the composition comprises an effective amount of thymol and an effective amount of eugenol.

It is a further object of the invention to provide a method for repelling, protecting, or guarding a pet from an invasive amphibian or reptile comprising applying a composition comprising an effective amount of thymol and an effective amount of eugenol.

It is a further object of the invention to provide a composition to control, neutralize, kill, or repel amphibians or reptiles that comprises an effective amount of thymol or a derivative thereof and an effective amount of eugenol or a derivative thereof, wherein the thymol or a derivative thereof, eugenol or a derivative thereof, and one or more additional active ingredients are encapsulated.

These and other objects of the invention will become more apparent from the disclosure and claims herein.

SUMMARY OF THE INVENTION

In one aspect of the invention, a composition to manage, that is, to control, neutralize, kill, or repel amphibians or reptiles, or to guard, protect, or repel a pet from an amphibian or reptile, comprises thymol and eugenol. More particularly, the composition comprises an effective amount of thymol or a derivative thereof and an effective amount of eugenol or a derivative thereof.

In another aspect of the invention, a composition to control, neutralize, kill, or repel amphibians or reptiles, or to guard, protect, or repel a pet from an amphibian or reptile, comprises an effective amount of thymol or any essential oil or compound that contains an effective amount of thymol, such as thyme oil, as a direct substitute for thymol, and an effective amount of eugenol or any essential oil or compound that contains eugenol or a derivative thereof.

In a further aspect of the invention, a composition to repel amphibians or reptiles comprises an effective amount of thymol or any essential oil or compound that contains or any essential oil or compound that contains an effective amount of thymol, such as thyme oil, as a direct substitute for thymol and an effective amount of eugenol or any essential oil or compound that contains eugenol or a derivative thereof.

In a further yet aspect of the invention, a composition to repel invasive amphibians or reptiles also comprises an effective amount of cinnamon oil or a derivative thereof, an effective amount of rosemary oil or a derivative thereof, and/or an effective amount of peppermint oil or a derivative thereof.

In a yet further aspect of the invention, a composition to guard, protect, or repel a pet from an amphibian or reptile also comprises an effective amount of cottonseed oil or a derivative thereof, an effective amount of castor oil or a derivative thereof, and/or an effective amount of lemongrass oil or a derivative thereof.

In a yet further aspect of the invention, a composition to control, neutralize, kill, or repel amphibians or reptiles, or to guard, protect, or repel a pet from an amphibian or reptile, also comprises an effective amount of clove oil, cinnamon oil (leaf), or any other essential oil or compound that contains clove oil, as a direct substitute for clove oil.

In a yet further aspect of the invention, a composition to control, neutralize, kill, or repel amphibians or reptiles, or to guard, protect, or repel a pet from an amphibian or reptile, optionally further comprises effective amounts of other active substances.

In a yet further aspect of the invention, other active ingredients in a composition to control, neutralize, kill, or repel amphibians or reptiles, or to guard, protect, or repel a pet from an amphibian or reptile, include, but are not limited to, one or more of castor oil or a derivative thereof, cottonseed oil or any other similar oil or a derivative thereof, cinnamon oil or a derivative thereof, lemongrass oil or a derivative thereof, rosemary oil or a derivative thereof, and/or peppermint oil or a derivative thereof.

In a yet further aspect of the invention, a composition to control, neutralize, kill, or repel amphibians or reptiles, or to guard, protect, or repel a pet from an amphibian or reptile, may also include, but is not limited to, inactive ingredients such as water, lecithins, urea, β-cyclodextrin, and/or isopropyl alcohol.

In a yet further aspect of the invention, a composition to control, neutralize, kill, or repel amphibians or reptiles, or to guard, protect, or repel a pet from an amphibian or reptile, comprises (i) an effective amount of thymol or any compound containing an effective amount of thymol or a derivative thereof and (ii) an effective amount of eugenol or any compound containing an effective amount of eugenol or a derivative thereof.

In a yet further aspect of the invention, a composition to control, neutralize, kill, or repel amphibians or reptiles, or to guard, protect, or repel a pet from an amphibian or reptile, comprises from about 0.4 to about 20% by weight, preferably from about 10 to about 20% by weight, based upon the weight of active ingredients in the total composition (that is, about 10 to about 20% w/w), of thymol or a derivative thereof.

In a yet further aspect of the invention, a composition to control, neutralize, kill, or repel amphibians or reptiles, or to guard, protect, or repel a pet from an amphibian or reptile, comprises an effective amount of eugenol or a derivative thereof.

In a yet further aspect of the invention, a composition to control, neutralize, kill, or repel amphibians or reptiles, or to guard, protect, or repel a pet from an amphibian or reptile, comprises from about 2.5 to about 20% w/w, based upon the weight of active ingredients in the total composition, preferably from about 5 to about 15% w/w, based upon the weight of active ingredients in the total composition, of eugenol or a derivative thereof.

In a yet further aspect of the invention, a composition to control, neutralize, kill, or repel amphibians or reptiles, or to guard, protect, or repel a pet from an amphibian or reptile, comprises an effective amount of rosemary oil or a derivative thereof.

In a yet further aspect of the invention, a composition to control, neutralize, kill, or repel amphibians or reptiles, or to guard, protect, or repel a pet from an amphibian or reptile, comprises from about 0.5 to about 5% w/w, based upon the weight of active ingredients in the total composition, preferably from about 1.0 to about 3.5% w/w, based upon the weight of active ingredients in the total composition, of rosemary oil or a derivative thereof.

In a yet further aspect of the invention, a composition for controlling, neutralizing, killing, or repelling an amphibian or reptile, or for protecting, guarding, or repelling a pet from an amphibian or reptile, comprises other active ingredients which include, but are not limited to, castor oil or a derivative thereof, cottonseed oil or a derivative thereof, cinnamon oil or a derivative thereof, lemongrass oil or a derivative thereof, and/or peppermint oil or a derivative thereof.

In a yet further aspect of the invention, a composition to control, neutralize, kill, or repel amphibians or reptiles, or to guard, protect, or repel a pet from an amphibian or reptile, comprises from about 25 to about 75% w/w, based upon the weight of active ingredients in the total composition, preferably from about 35 to about 65% w/w, based upon the weight of active ingredients in the total composition, of castor oil or a derivative thereof.

In a yet further aspect of the invention, a composition to control, neutralize, kill, or repel amphibians or reptiles, or to guard, protect, or repel a pet from an amphibian or reptile, comprises from about 5 to about 20% w/w, based upon the weight of active ingredients in the total composition, preferably from about 7.5 to about 16% w/w, based upon the weight of active ingredients in the total composition, of cottonseed oil or a derivative thereof.

In a yet further aspect of the invention, a composition to control, neutralize, kill, or repel amphibians or reptiles, or to guard, protect, or repel a pet from an amphibian or reptile, comprises from about 0.5 to about 6.0% w/w, based upon the weight of active ingredients in the total composition, preferably from about 1.0 to about 4.0% w/w, based upon the weight of active ingredients in the total composition, of cinnamon oil or a derivative thereof.

In a yet further aspect of the invention, a composition to control, neutralize, kill, or repel amphibians or reptiles, or to guard, protect, or repel a pet from an amphibian or reptile, comprises from about 0.5 to about 5% w/w, based upon the weight of active ingredients in the total composition, preferably from about 1.0 to about 4.0% w/w, based upon the weight of active ingredients in the total composition, of lemongrass oil or a derivative thereof.

In a yet further aspect of the invention, a composition to control, neutralize, kill, or repel amphibians or reptiles, or to guard, protect, or repel a pet from an amphibian or reptile, comprises from about 0.5 to about 5% w/w, based upon the weight of active ingredients in the total composition, preferably from about 1.0 to about 4.0% w/w, based upon the weight of active ingredients in the total composition, of peppermint oil or a derivative thereof.

In a yet further aspect of the invention, the active ingredients can be present in a total amount of from about 0.5 to about 99.5% w/w, based upon the total weight of the total composition, preferably in a total amount of from about 2.0 to about 80% w/w, based upon the total weight of the total composition. The inactive ingredients can be present in a total amount of from about 99.5 to about 0.5% w/w, based upon the total weight of the total composition, preferably in a total amount of from about 98 to about 20% w/w, based upon the total weight of the total composition.

In a yet further aspect of the invention, a composition to control, neutralize, kill, or repel amphibians or reptiles, or to guard, protect, or repel pets from an amphibian or reptile, comprises from about 0.1 to about 95% w/w of thymol and from about 95 to about 0.1% w/w of eugenol or a derivative thereof, based upon the total weight of the thymol and eugenol.

In a yet further aspect of the invention, a composition to control, neutralize, kill, or repel amphibians or reptiles, or to guard, protect, or repel pets from an amphibian or reptile, further comprises at least one compound selected from the group consisting of diluents, solvents, thickeners, stabilizers, propellants, fragrances, insecticides, insect repellants, amphibian attracting agents, and canine or feline repelling agents.

In a yet further aspect of the invention, a composition for controlling, neutralizing, killing, or repelling an amphibian or reptile, or for protecting, guarding, or repelling a pet from an amphibian or reptile, comprises at least one active ingredient comprising an effective amount of thymol or a derivative thereof and an effective amount of eugenol or a derivative thereof.

In a yet further aspect of the invention, a composition for controlling, neutralizing, killing, or repelling an amphibian or reptile, or for protecting, guarding, or repelling a pet from an amphibian or reptile, comprises inactive ingredients such as water, lecithins, urea, β-cyclodextrin, and/or isopropyl alcohol.

In a yet further aspect of the invention, in a composition for controlling, neutralizing, killing, or repelling an amphibian or reptile, or for protecting, guarding, or repelling a pet from an amphibian or reptile, at least one active ingredient is encapsulated, preferably in β-cyclodextrin.

In a yet further aspect of the invention, in a composition for controlling, neutralizing, killing, or repelling an amphibian or reptile, or for protecting, guarding, or repelling a pet from an amphibian or reptile, the amphibian or reptile is a cane toad.

In a yet further aspect of the invention, a method of controlling, neutralizing, killing, or repelling an amphibian or reptile comprises administering an effective amount of a composition comprising (i) an effective amount of thymol or any compound containing an effective amount of thymol or a derivative thereof and (ii) an effective amount of eugenol or any compound containing an effective amount of eugenol or a derivative thereof.

In a yet further aspect of the invention, in a method of controlling, neutralizing, killing, or repelling an amphibian or reptile, the amphibian or reptile is a cane toad.

In a yet further aspect of the invention, a method of protecting, guarding, or repelling a pet from an amphibian or reptile comprises administering an effective amount of a composition comprising (i) an effective amount of thymol or any compound containing an effective amount of thymol or a derivative thereof and (ii) an effective amount of eugenol or any compound containing an effective amount of eugenol or a derivative thereof.

In a yet further aspect of the invention, a method of protecting, guarding, or repelling a pet from an amphibian or reptile comprises administering an effective amount of a composition comprising (i) an effective amount of thymol or any compound containing an effective amount of thymol or a derivative thereof and (ii) an effective amount of eugenol or any compound containing an effective amount of eugenol or a derivative thereof, to the skin of the amphibian or reptile, to a surface adjacent to the amphibian or reptile, or to a surface near or comprising where the amphibian or reptile resides, nests, frequents, or is expected to frequent.

In a yet further aspect of the invention, in a method of protecting, guarding, or repelling a pet from an amphibian or reptile, the amphibian or reptile is a cane toad.

In a yet further aspect of the invention, the composition of the invention is applied in concentrated or powder form to a wet or liquid environment where the composition will dissolve, disseminate, or spread.

The composition of the invention preferably comprises a liquid that is typically applied in a spray bottle or other similar handheld container. It is within the scope of the invention that the composition could be applied in an industrial or commercial applicator such as a pump mechanism with a hose. The composition could also be applied as a powder or paste, dependent upon the application.

The liquid composition should be applied to a given location or to one or more actual pests with one or more squirts from, for example, a spray bottle. Dependent upon the ingredients, one or more sprays may be necessary to be effective. Typically, 1 or 2 squirts may irritate a pest, and 3 to 6 sprays may anesthetize the pest, whereas 6 or more squirts may euthanize the pest.

DETAILED DESCRIPTION OF THE INVENTION

Figure 1:
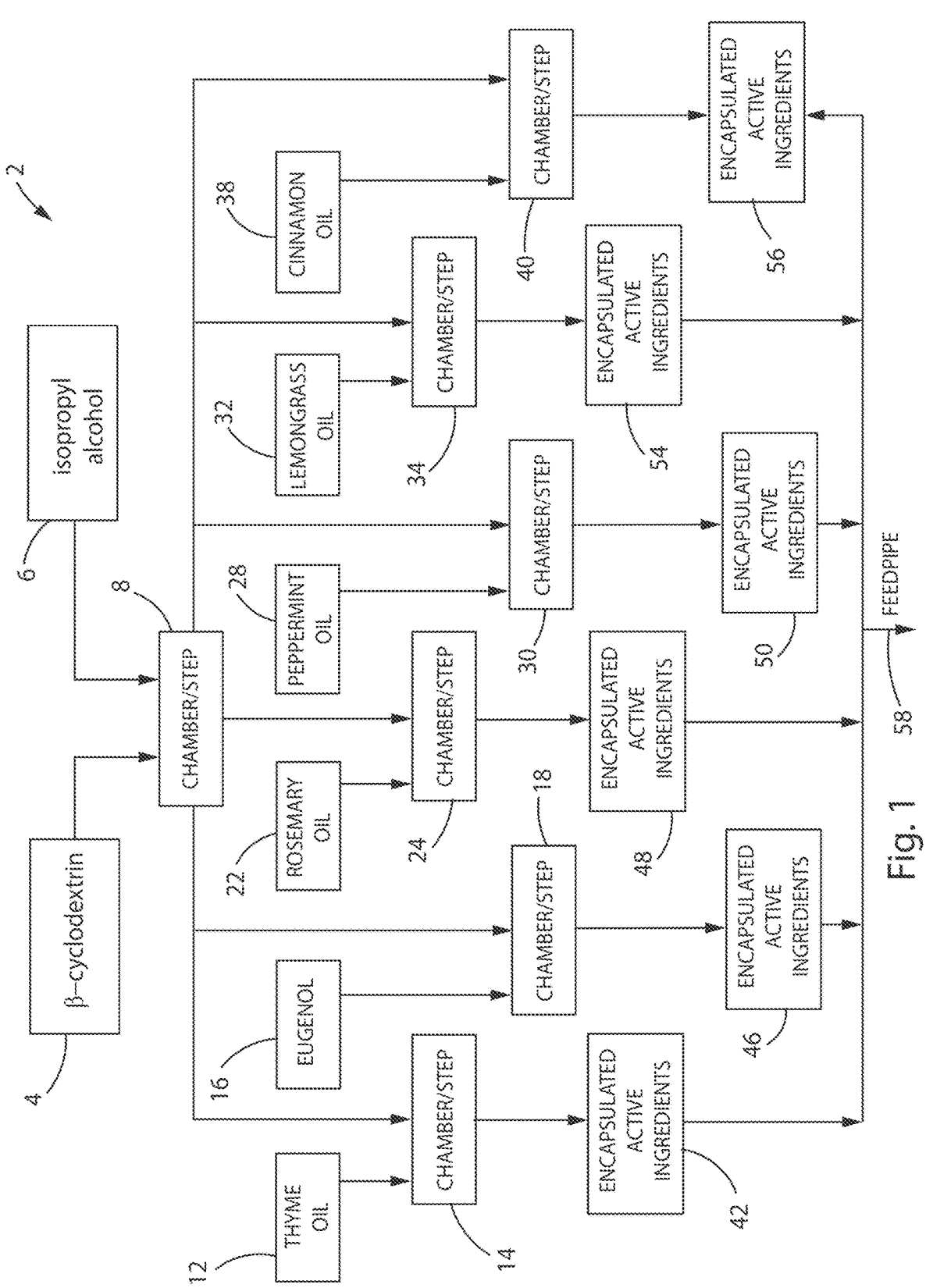
FIG. 1 represents a first stage or phase, namely, beta-cyclodextrin encapsulation of primary ingredients, of a method for the preparation of a product according to the invention.

It has been found that a humane pesticidal composition for managing, controlling, neutralizing, killing, or repelling cane toads and other amphibians or reptiles, or for guarding, protecting, or repelling pets from an amphibian or reptile, can be achieved by contacting the amphibian or reptile or a surface with one or more active ingredients and a carrier comprised of one or more inactive ingredients. The pesticidal composition may be formulated such that it is relatively safe to handle and can be easily administered to pest amphibians such as cane toads and Cuban treefrogs or reptiles.

Components

In a first aspect of the invention, a composition for managing, controlling, neutralizing, killing, or repelling amphibians or reptiles, or for guarding, protecting, or repelling pets from an amphibian or reptile, comprises thymol and eugenol. More specifically, the composition comprises an effective amount of thymol or a derivative thereof and an effective amount of eugenol or a derivative thereof. Optionally the composition may also comprise an effective amount of rosemary oil or a derivative thereof.

The repellant or pesticidal composition of the invention optionally further comprises other active substances. Such other active substances include, but are not limited to, one or more of castor oil or a derivative thereof, cottonseed oil or a derivative thereof, cinnamon oil or a derivative thereof, lemongrass oil or a derivative thereof, and peppermint oil or a derivative thereof. Additional optional, inactive ingredients that function as a carrier include, but are not limited to, water, lecithins, urea, β-cyclodextrin, and isopropyl alcohol.

An important aspect of the invention is the ratio of thymol to eugenol. In a concentrated formulation of the composition of the invention the percentages of thymol and eugenol will approach 50% by weight for thymol and 50% by weight for eugenol. Because in diluted formulations the ratios can extend well below 0.1% for thymol and 0.1% for eugenol, it becomes necessary to rely on the ratio of thymol to eugenol to avoid the tedious issue of describing the endless mathematical figuring of dilutions and applications. This is simply due to the basic mathematical function of effective doses per application/formulation weight. Furthermore, it is possible to spread the effective amount over multiple applications. While this would require a user to apply several applications, it would effectively be the same formulation described here.

Ultimately one only needs a specific amount of thymol and eugenol, and it is the ratio of those two ingredients that can make the composition of the invention effective. Thymol and eugenol could comprise 100% of the ingredients or less than 1% of the total ingredients, dependent upon dilution and the method of application. There are complementary effects that occur with the inclusion of the other ingredients; however, whether someone makes the composition of the invention ultra-concentrated or dilutes it with 100 gallons of water, as long as they are getting the ratios—primarily the thymo:eugenol ratio and calculating the amount in a metered dose, then they have manufactured a substantially identical product. If it takes 0.5 ml or 5.2 ml or 7.4 mg or 10 gallons to deliver the amount in a useful thymol:eugenol ratio, then it is identical despite the drastic percentage differences.

For consumer product pre-dilution uses, there will be substantially less water, which will push the weight of the active ingredients up at least 80% of the weight of the total composition. In theory the entire formulation could be 90% thymol and 10% eugenol, 10% thymol and 90% eugenol, or anywhere in between. The preferred ratio of thymol to eugenol is in the range of 60 to 40.

In another aspect of the invention, the thymol to eugenol ratio is somewhere in the range of about 20:80 to about 80:20, independent of other components. It is possible to achieve the thymol:eugenol ratio necessary and contain enough of each active ingredient to treat the targeted pest (as determined by body mass) where mathematically the total thymol as compared to the total formulation could be anywhere between 0.001% to 99% with the same being true for eugenol. As long as there is a minimum amount of mg of thymol and a minimum amount of mg of eugenol per pest being treated, the composition according to the invention will be effective.

Thus, the dilution could be increased exponentially, and it would appear as vastly different in terms of % w/w. However, it would be the same provided the exponential increase in application. That is, the product will require more of the final product to treat the same pest, to a specific degree.

It should be noted that thyme oil EO and clove oil EO, or other components that contain thymol and eugenol, work as effectively as long as the overall thymol and eugenol ratios are within the limits described and quantity within the range the effective amount.

With regard to dilution or concentration and the effective amount of the active ingredients in the formulation according to the invention, it should be appreciated that the effective amounts of thymol and eugenol in the formulation are better understood as a relative ratio of thymol to eugenol of from about 20% thymol to about 80% eugenol to about 80% thymol to about 20% eugenol, relative to each other. In this range the efficacy increases towards equilibrium or parity, that is, about a 50:50 ratio of thymol to eugenol, and a total where the quantity of the two phenols meets a minimum amount of each compound. Any compound that contains thymol and eugenol with a ratio in the effective range, either only containing those two compounds or containing any number of compounds, will be effectively the exact same formulation.

It is easily possible to substitute another compound that contains the primary listed phenols and arrive at essentially the exact same formulation. For example, thyme oil (essential oil) contains from about 30% to about 65% thymol, and clove oil (essential oil) contains from about 70% to about 98% eugenol. Thus, a combination of these substances to where the ratios of thymol to eugenol are within the range of the effective dose would produce an exactly equivalent result. There are other variations of essential oils and other compounds that contain the specific phenols, and, as long as the ratios of those phenols are in the specific order, the composition will be effective.

Dilution or concentration of a composition according to the invention comprises a mathematical manipulation of the quantities a particular formulation contains. The result is either the reduction of the amounts of ingredients and spreading application of the ingredients across a larger number of applications or concentration, which increases the number of effective doses per application. However, in all cases they achieve the same result.

In the retail/consumer pet-based embodiment of the product of the invention the effective amount is spread across approximately 5 to 6 sprays. This particular embodiment also utilizes other synergies and modes of actions, which further illustrate the ability to embed an effective amount of the formulation into another formulation. Furthermore, the retail/consumer pet-based embodiment utilizes 3.01% thyme oil (Essential Oil) to provide the thymol and 1.6% eugenol, this helps to illustrates the how the formulation of the effective amount is not based only an overall formulation percentage (w/w) but alternatively based on the relative ratio of thymol to eugenol and the total amount of each in the context of dilution.

An effective amount of thymol or a derivative thereof could comprise from about 0.5 to about 25% w/w, based upon the total weight of active ingredients in the composition, preferably from about 10 to about 20% w/w, based upon the total weight of active ingredients in the composition. An effective amount of eugenol or a derivative thereof could comprise from about 2.5 to about 20% w/w, based upon the total weight of active ingredients in the composition, preferably from about 5 to about 15% w/w, based upon the total weight of active ingredients in the composition. An effective amount of rosemary oil could comprise from about 0.5 to about 5% w/w, based upon the total weight of active ingredients in the composition, preferably from about 0.2 to about 0.7% w/w, based upon the total weight of active ingredients in the composition.

Castor oil or a derivative thereof could be present in an amount of from about 25 to about 75% w/w, based upon the total weight of active ingredients in the composition, preferably from about 7 to about 13% w/w, based upon the total weight of active ingredients in the composition. Cottonseed oil or a derivative thereof could be present in an amount of from about 5 to about 20% w/w, based upon the total weight of active ingredients in the composition, preferably from about 7.5 to about 16% w/w, based upon the total weight of active ingredients in the composition. Cinnamon oil or a derivative thereof could be present in an amount of from about 0.5 to about 6.0% w/w, based upon the total weight of active ingredients in the composition, preferably from about 1.0 to about 4.0% w/w, based upon the total weight of active ingredients in the composition. Lemongrass oil or a derivative thereof could be present in an amount of from about 0.5 to about 5% w/w, based upon the total weight of active ingredients in the composition, preferably from about 1.0 to about 4.0% w/w, based upon the total weight of active ingredients in the composition. Peppermint oil or a derivative thereof could be present in an amount of from about 0.5 to about 5% w/w, based upon the total weight of active ingredients in the composition, preferably from about 1.0 to about 4.0% w/w, based upon the total weight of active ingredients in the composition.

The active ingredients can be present in a total amount of from about 10 to about 40% w/w, preferably in a total amount of from about 15 to about 30% w/w. The inactive ingredients can be present in a total amount of from about 60 to about 90% w/w, preferably in a total amount of from about 70 to about 85% w/w.

The composition of the invention may also comprise additional agents such as, for example, appropriate diluents, solvents, thickeners, stabilizers, propellants or other agents to assist in aerosolizing the composition, and other excipients as appropriate for the particular pesticidal agent and the mode of administration. Further, the composition may also comprise fragrances, insecticides or insect repellants (e.g., citral). Alternatively or additionally, other agents such as amphibian attracting agents or canine or feline repelling agents may be included in the composition of the present invention.

Percentage (w/w) is more dependent on the effective dose provided per application and the density of the other compounds in the formulation. This is because the actual percentage listed in each formulation is simply a function of the specified application dosage divided by the number of intended effective doses per formulation amount, and final listed percentage (w/w) can vary slightly based on the density of the other constituents included in the formulation.

However, the effective amount can be expressed or considered based not only on the percentage (w/w) of the phenols represent of a given compound, but taken in context of the ratio of thymol to eugenol. Again, this is simply because in a concentrated formulation the percentage (w/w) will approach 50% for thymol and 50% for eugenol. Furthermore, it is possible to spread the effective amount over multiple applications, while this would require a user to apply several applications, it would effectively be the same formulation described here. Because in diluted formulations the ratios can extend well below 0.1% for thymol and 0.1% for eugenol, it becomes necessary to rely on the ratio of thymol to eugenol to avoid the tedious issue of describing the endless mathematical figuring of dilutions and applications. This is simply due to the basic mathematical function of effective doses per application/formulation weight.

It should be noted that thyme oil EO and clove oil EO, or other components that contain thymol and eugenol, work as effectively as long as the overall thymol and eugenol ratios are within the limits described and quantity within the range the effective amount.

With regard to dilution or concentration and the effective amount of the active ingredients in the formulation according to the invention, it should be appreciated that the effective amounts of thymol and eugenol in the formulation are better understood as a relative ratio of thymol to eugenol of from about 20% thymol to about 80% eugenol to about 80% thymol to about 20% eugenol, relative to each other. In this range the efficacy increases towards equilibrium or parity, that is, about a 50:50 ratio of thymol to eugenol, and a total where the quantity of the two phenols meets a minimum amount of each compound. Any compound that contains thymol and eugenol with a ratio in the effective range, either only containing those two compounds or containing any number of compounds, will be effectively the exact same formulation.

It is easily possible to substitute another compound that contains the primary listed phenols and arrive at essentially the exact same formulation. For example, thyme oil (essential oil) contains from about 30% to about 65% thymol, and clove oil (essential oil) contains from about 70% to about 98% eugenol. Thus, a combination of these substances to where the ratios of thymol to eugenol are within the range of the effective dose would produce an exactly equivalent result. There are other variations of essential oils and other compounds that contain the specific phenols, and, as long as the ratios of those phenols are in the specific order, the composition will be effective.

Dilution or concentration of a composition according to the invention comprises a mathematical manipulation of the quantities a particular formulation contains. The result is either the reduction of the amounts of ingredients and spreading application of the ingredients across a larger number of applications or concentration, which increases the number of effective doses per application. However, in all cases they achieve the same result.

In the retail/consumer pet-based embodiment of the product of the invention the effective amount is spread across approximately 5 to 6 sprays. This particular embodiment also utilizes other synergies and modes of actions, which further illustrate the ability to embed an effective amount of the formulation into another formulation. Furthermore, the retail/consumer pet-based embodiment utilizes 3.01% thyme oil (Essential Oil) to provide the thymol and 1.6% eugenol, this helps to illustrates the how the formulation of the effective amount is not based only an overall formulation percentage (w/w) but alternatively based on the relative ratio of thymol to eugenol and the total amount of each in the context of dilution.

Preparation

To prepare a composition according to the invention, quantities of active and inactive ingredients could be admixed in, for example, a four-gallon container. A typical composition would be as follows, based upon the percent by weight of the total composition:

| Ingredient | Percent by Weight |
| --- | --- |
| Castor oil (CAS No. 8001-79-4*), 1019 g | 10.19 |
| Thyme oil (CAS No. 8007-46-3*), 301 g | 3.01 |
| Cottonseed oil (CAS No. 8001-29-4*), 236 g | 2.36 |
| Eugenol (CAS No. 97-53-0*), 160 g | 1.60 |
| Cinnamon oil (CAS No. 8015-91-6*), 58 g | 0.58 |
| Lemongrass oil (CAS No. 8007-02-1*), 53 g | 0.53 |
| Rosemary oil (CAS No. 8000-25-7*), 33 g | 0.33 |
| Peppermint oil (CAS No. 8006-90-4*), 31 g | 0.31 |
| Other ingredients,** 8109 g | 81.09 |
| | 100.00 |

*Available, for example, from Fischer Scientific, Fair Lawn, NJ; Sigma-Aldrich, St Louis, MO; or Spectrum Chemicals Mfg. Coro., Gardenia, CA.
**Water; lecithins (CAS No. 8002-43-5), urea (CAS No. 57-13-6), β-cyclodextrin (CAS No. 7585-39-9), and isopropyl alcohol (CAS No. 67-63-0), available from Fischer Scientific, Sigma-Aldrich, or Spectrum Chemicals.

In a preferred embodiment of the invention, in a first stage or phase certain of the active ingredients are encapsulated with an encapsulation agent such as beta-cyclodextrin under sonification. The active ingredients to be encapsulated in the first stage or phase can be encapsulated separately, together, or a combination of separately and together. Then, the encapsulated components from the first stage or phase are admixed with other components in a final mixing container in a final mixing step.

In a second stage or phase one or more of the active ingredients that are not encapsulated in the first stage or phase can be subjected to high speed/high shear mixing, optionally with a mixing agent such as isopropyl alcohol. The active ingredients to be treated in the second stage or phase can be treated separately, together, or a combination of separately and together. The result can be a partially esterified mixture or a slurry, which is then admixed with other components in the final mixing container in a final mixing step.

The first and second steps or phases are preferentially performed substantially currently or simultaneously so that the products of each stage or phase are introduced into the final mixing container either together or simultaneously. Optionally the first stage or phase and the second stage or phase can be performed sequentially, in either order, as long as the respective products are introduced into the final mixing container either together or simultaneously.

In a third stage the products of the first and second stages are admixed in a final mixing tank. Optionally the admixture is diluted with water and recirculated into a connected tank with ultra-high speed shear cavitation to achieve a stabilized emulsion.

In each of the first, second, and third stages or phases, when components are mixed, the mixing apparatus will preferably comprise an external system where liquid is drawn from a lower portion of the mixing chamber, pumped through a high shear component and then through an ultrasound unit, and then returned to the upper portion of the chamber. The external system will comprise at least one pump, preferably two or more, to move fluid.

Figure 2:
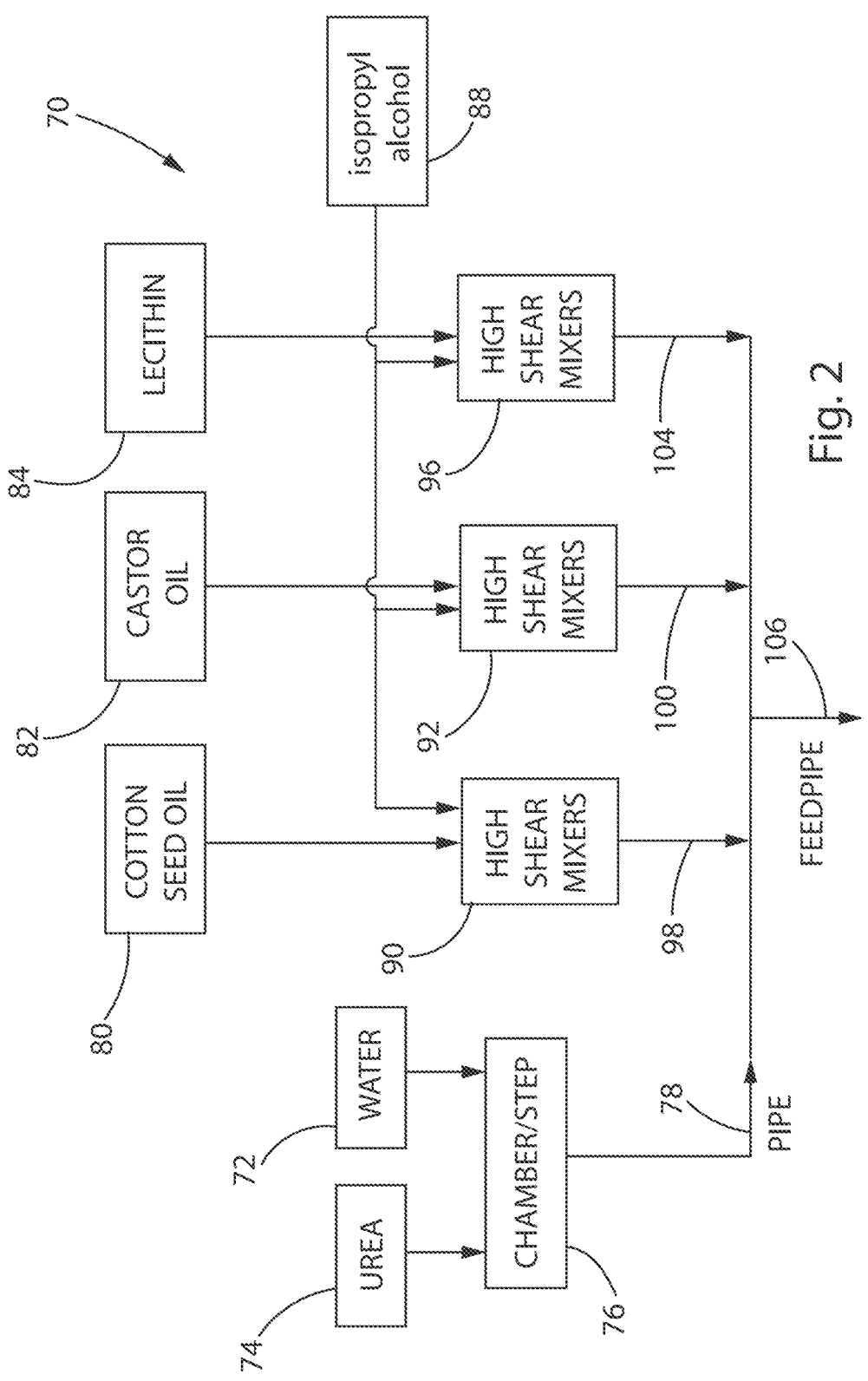
FIG. 2 represents a second stage or phase, namely, lipid processing, of a method for the preparation of a product according to the invention.
Figure 3:
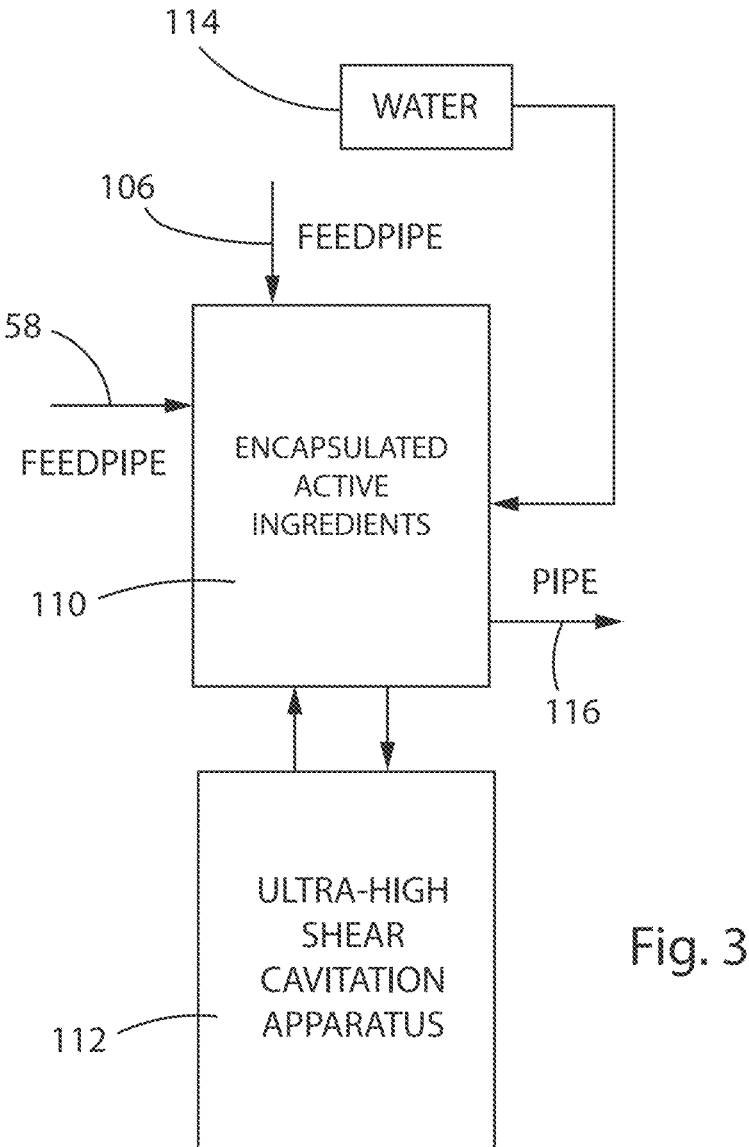
FIG. 3 represents a third stage or phase, namely, final mixing, of a method for the preparation of a product according to the invention.

The preparation of a composition according to the invention can perhaps be appreciated more from the example represented by FIGS. 1 to 3.

FIG. 1 is a schematic representation of a first stage or phase of a preparation of a preferred embodiment of the invention. In the process shown in FIG. 1, in an initial mixing or encapsulation phase 2, β-cyclodextrin 4 and isopropyl alcohol 6 are admixed in chamber or step 8 to form a slurry. Slurry from chamber or step 8 is then admixed, separately, with thyme oil 12 in chamber or step 14, eugenol 16 in chamber or step 18, rosemary oil 22 in chamber or step 24, peppermint oil 28 in chamber or step 30, lemongrass oil 32 in chamber or step 34, and cinnamon oil 38 in chamber or step 40, respectively, to form encapsulated products. Each constituent has a different percentage encapsulation (percentage by total mass of the constituent). The respective mixtures are recirculated with sonification until full β-cyclodextrin loading is achieved (nano-encapsulation at maximum load efficiency). This may be run sequentially for a single processing set up or in parallel, for a multi-segregated set up.

The encapsulated active ingredients 42, 46, 48, 50, 54, and 56 feed through feedpipe 58 to final mixing and dilution tank 110. (Feedpipe 58 may represent individual feedpipes as well.)

A second stage or phase comprises a lipid processing step 70 shown in FIG. 2, where water 72 and urea 74 are admixed in chamber or step 76 to form an aqueous urea mixture that travels through pipe 78. Cotton seed oil 80, castor oil 82, and lecithin 84 are each admixed with isopropyl alcohol 88 in high speed, high shear mixers 90, 92, and 96, respectively, to form partially esterified cottonseed oil, partially esterified castor oil, and partially esterified lecithin, respectively. The partially esterified cottonseed oil, partially esterified castor oil, and partially esterified lecithin, respectively, are fed through feedpipe 106 to final mixing and dilution tank 110. (Feedpipe 106 may represent individual feedpipes as well.)

The first and second steps or phases are performed substantially currently or simultaneously so that the encapsulated active ingredients from the first stage or phase and the partially esterified active ingredients from the second stage or phase are introduced into the final mixing container either together or simultaneously. Optionally the first stage or phase and the second stage or phase can be performed sequentially, in either order, as long as the encapsulated active ingredients from the first stage or phase and the partially esterified active ingredients from the second stage or phase are introduced into the final mixing container either together or simultaneously. The final product will comprise encapsulated active ingredients as well as lipified and/or partially esterified ingredients which optionally may be encapsulated as well.

As shown in FIG. 3, final mixing and dilution tank 110 is in liquid or fluid communication with an ultra-high shear cavitation apparatus 112 so that liquid from final mixing and dilution tank 110 recirculates into and out of high shear cavitation apparatus 112 until there is full cavitation and a stabilized emulsion is achieved. After that occurs, water 114 is added to the final mixing and dilution tank 110 and admixed with the stabilized emulsion, to form the final product. Final product exits through pipe 116 for further processing into bottles and/or other containers.

It is within the scope of the invention that there may be variations of the process described above. For example, there may be fewer active ingredients, or none or not all active ingredients will be encapsulated. Or, there may not be a final cavitation and recirculation step, etc.

Application

A composition according to the invention is preferably delivered topically, which may include delivery by aerosol, liquid spray, dip, dripper, wipe, brush or absorbent support.

The composition of the invention is preferably a liquid that is typically applied in a spray bottle or other similar handheld container. It is within the scope of the invention that the composition could be applied in an industrial or commercial applicator such as a pump mechanism with a hose. It is also within the scope of the invention that the composition of the invention is in another form, such as an aerosol, a paste, or a powder In a method of repelling or killing amphibians or reptiles, that is, pests, a repellant or pesticidal composition according to the invention should be applied to a given location or to one or more actual pests with one or more squirts from, for example, a spray bottle. Dependent upon the ingredients, one or more sprays may be necessary to be effective. Typically 1 or 2 squirts of the composition may irritate a pest, 3 to 6 sprays may anesthetize the pest, whereas 6 or more squirts may be necessary to euthanize the pest.

The particular active ingredients or derivatives thereof may be selected on the basis of relative efficacy in killing a target pest amphibian or reptile species. Such efficacy may vary where it is desirable to kill pest amphibians or reptiles of a certain size or range of sizes. Further, the particular active ingredient or derivative thereof may be selected on the basis of relative stability in a specific environment or suitability for a desired mode of administration.

The composition of the invention is particularly suitable for use in euthanizing cane toads and Cuban treefrogs. However, the composition of the invention may also be suitable for euthanizing other species of pest amphibians or reptiles such as the coqui and the American bullfrog, which is a known or potential pest in many locations outside its natural range, including the western United States, Hawaii, Brazil, and Europe.

Accordingly, the method of the invention preferably involves contacting the invasive amphibian or reptile with a repellant or pesticidal composition according to a first aspect of the present invention. Preferably, the repellant or pesticidal composition is brought into contact with the invasive amphibian or reptile by topical administration. Such topical administration may be achieved through means including, but not limited to, direct topical application of the composition to the invasive amphibian or reptile by the user, for example, by brushing the composition onto the dorsal surface of the invasive amphibian or reptile or, more conveniently, by spraying the composition onto the dorsal surface of the invasive amphibian or reptile. Accordingly, the composition may preferably be provided as a liquid pump spray or aerosol formulation. Particularly suitable spray formulations include formulations for administration as an aerosol spray (either via a handheld sprayer, e.g., an aerosol can, a larger domestic spray pack, a truck sprayer, or a crop duster).

Alternatively, topical administration may also be achieved by indirect means requiring no manual application. For example, an absorbent support may be continuously infused with the composition of the present invention such that it is applied to the invasive amphibian or reptile when the invasive amphibian or reptile comes into contact with the support. Such a support can be incorporated into other structures in a manner whereby an invasive amphibian or reptile will contact the composition when moving through or into the structure (e.g., the support may be present on flaps or other elements of a trap that may be contacted by an invasive amphibian or reptile). Alternatively, the composition of the present invention may be used to fill a bath residing in the base of a trap, or used as a liquid spray or aerosol formulation in a mechanism whereby an invasive amphibian or reptile can trigger the spraying of the composition.

A kit, according to the invention, may provide one or more active ingredients and one or more inactive ingredients in the same or separate packaging. For example, the active and/or inactive ingredients could be in separate tubes, bottles, or other containers that are sold together, so that the contents can be admixed prior to use.

The kit may also include one or more delivery systems for active and/or inactive ingredients, such as, for example, a handheld sprayer (e.g., a trigger sprayer or an aerosol can) or a larger, domestic spray pack. Alternatively, the kit may include an absorbent support delivery system or automated delivery system as described above.

Compositions of the invention may further comprise at least one compound selected from the group consisting of diluents, solvents, thickeners, stabilizers, absorbents, propellants, fragrances, insecticides, insect repellants, amphibian attracting agents, and canine or feline repelling agents. The compositions may comprise sufficient thickeners, stabilizers, and/or absorbents to produce a dry composition, especially suitable for powder or pellets.

A composition according to the invention is preferably delivered topically, which may include delivery by aerosol, liquid spray, dip, dripper, wipe, brush or absorbent support. Embodiment: Retail/Consumer Pet Specific for Direct Deterrent and Spot Treatment Application A first embodiment is intended for retail application and as such is designed to be used as either a direct contact repellent (sprayed directly on cane toads, iguanas, snakes, or other amphibians, reptiles, or terrestrial gastropods, listed target animals) or applied as a spot treatment repellent to known or suspected nests or burrows to repel listed target animals from treated areas for up to 28 days.

Furthermore, this embodiment is specific to its use and is intended for use to protect pets and domesticated animals. While highly specific to canines, this embodiment has continued efficacy extending to other mid- to large-size mammals (such as horses or livestock). However, the assumed typical use is by dog owners.

Functionality Related to the Primary Compound—End User Control Over Dosage and Effect A primary feature of another embodiment is that it is designed to allow the end user to apply a low dose of the effective amount of the base formulation to produce a repelling action, or to increase the application to reversibly sedate or anesthetize or euthanize listed target animals. The end user can control over the overall result by the number of spray applications. In this way, the user can harmlessly repel a potential threat, or, when necessary, the user is able to stop or terminate the threat. This allows the flexibility for the end user to affect the appropriate result relative to the situation.

Use and Determination of Quantity for the Base Formulation Effective Amount

More specifically, in this embodiment the effective amount of the base formulation provided per dose is based upon a 3 lb. cane toad (aka *Bufo* toad)—which is the average body mass of this toad. Using the average ml per trigger pull (1.0-1.5 ml) in the various manual trigger sprayers suitable for use and convenient for packaging, the total amount of the (3 lb. toad determined) effective amount was calculated based on an average 3 lb. toad. The effective amount per trigger pull was calculated to provide approximately ⅙th of the effective amount. Thus, the total of the base formulation effective amount of roughly 0.23 ml provided within a total solution volume per trigger pull of approximately 6.5 to 7.8 ml. This is to be distributed over 4 to 6 spray applications, dependent upon on trigger per-spray volume. In this way the total effective amount is provided in a way that is titratable by the end user.

The total solution contains compounds that provide synergistic and/or complementary/enhancing effects, alternative functionality, stabilizing and preserving effects and dilution. For illustrative purposes the amount of thymol in this embodiment is approximately 1.76% (w/w) and eugenol is 1.83% (w/w) where the total ratio of thymol-eugenol is within the 40%-60%|60%-40% range.

In a method of repelling or killing pests, a composition according to the invention should be applied to a given location or to one or more actual pests with one or more squirts from, for example, a spray bottle. Dependent upon the ingredients, one or more sprays may be necessary to be effective. Typically 1 or 2 squirts of the composition may irritate a pest, 3 to 6 sprays may anesthetize the pest, whereas 6 or more squirts may be necessary to euthanize the pest.

Compositions of the invention may further comprise at least one compound selected from diluents, solvents, thickeners, stabilizers, propellants, fragrances, insecticides, insect repellants, amphibian attracting agents or canine or feline repelling agents.

A composition according to the invention is preferably delivered topically, which may include delivery by aerosol, liquid spray, dip, dripper, wipe, brush or absorbent support.

A method of protecting, guarding, or repelling a pet from an amphibian or reptile comprises administering an effective amount of a composition comprising (i) an effective amount of thymol or any compound containing an effective amount of thymol or a derivative thereof and (ii) an effective amount of eugenol or any compound containing an effective amount of eugenol or a derivative thereof, to the skin of the amphibian or reptile, to a surface adjacent to the amphibian or reptile, or to a surface near or comprising where the amphibian or reptile resides, nests, frequents, or is expected to frequent.

The composition of the invention can be applied in concentrated or powder form to a wet or liquid environment where the composition will dissolve, disseminate, or spread.

The composition of the invention preferably comprises a liquid that is typically applied in a spray bottle or other similar handheld container. It is within the scope of the invention that the composition could be applied in an industrial or commercial applicator such as a pump mechanism with a hose. The composition could also be applied as a powder or paste, dependent upon the application.

The particular active ingredients or derivatives thereof may be selected on the basis of relative efficacy in killing a target pest amphibian species. Such efficacy may vary where it is desirable to kill pest amphibians of a certain size or range of sizes. Further, the particular active ingredient or derivative thereof may be selected on the basis of relative stability in a specific environment or suitability for a desired mode of administration.

Embodiment: Retail/Consumer Pet Specific for Direct Deterrent and Spot Treatment Application This embodiment is intended for retail application and as such is designed to be used as either a direct contact repellent (sprayed directly on cane toads, iguanas, snakes or other amphibians, reptiles, or terrestrial gastropods, listed target animals) or applied as a spot treatment repellent to known or suspected nests or burrows to repel listed target animals from treated areas for up to 28 days.

Furthermore, this embodiment is specific to its use and intended for use to protect pets and domesticated animals. While highly specific to canines, this embodiment has continued efficacy extending to other mid to large size mammals (such as horses or livestock). However, the assumed typical use is by dog owners.

Functionality Related to the Primary Compound—End User Control Over Dosage and Effect Additionally, a primary feature of this embodiment is that is designed to allow the end user to apply a low dose of the effective amount of the base formulation producing a repelling action, increase the application to reversable sedate or anesthetize or euthanize listed target animals. The end user can control the overall result by the number of spray applications. In this way, the user can harmlessly repel a potential threat, or when necessary, the user is able to stop or terminate the threat. This allows the flexibility for the end user to affect the appropriate result relative to the situation.

Manner of Providing the Requisite Thymol and Eugenol

Thyme oil EO is used to provide the appropriate thymol ratio and eugenol along with eugenol present in cinnamon oil are used to provide the eugenol ratio. The basic ratio of thymol to eugenol ranging in a bounds of 40% thymol-60% eugenol to 40% thymol-60% eugenol synergist effects that enhance the overall effectiveness of the initial repelling effect and to provide persistent repelling action when used as a spot treatment are also incorporated.

Functionality in this Embodiment that is Independent to the Primary Base Formulation Efficacy This embodiment contains several other components that are intended to provide functionality beyond that of the functionality of the base formulation, as discussed in this document. This is because this embodiment was created as a complete solution to the fill the current market void by providing the only available product to pet owners to help prevent potentially fatal bufotoxin exposure and other related toxic amphibian and reptilian encounters of the pets. As this is a complete solution, it includes additional functionality that is independent to the primary base formulation, as discussed in this document. It should be noted that these added components are not necessary to produce positive results, as measured by repelling, sedating, anesthetizing, and euthanizing of listed target animals, from an effective amount of the base formulation.

The inclusion of said added functionality and the constituents chosen to provide said functionality were done so in a manner that provides an overall complementary and synergistic result, thereby increasing the total efficacy of the base formulation and the expected results of the additional functionality.

Is the end user to provide the effective amount of the base formulation over several spray applications to a given toad, iguana, snake or another amphibian or reptile, can be applied as a spot treatment and (terrestrial) repellent to known or suspected nests or burrows.

Thyme oil EO is used to provide the appropriate thymol ratio and eugenol along with eugenol present in cinnamon oil are used to provide the eugenol ratio. The basic ratio of thymol to eugenol ranging in a bounds of 40% thymol-60% eugenol to 40% thymol-60% eugenol synergist effects that enhance the overall effectiveness of the initial repelling effect and to provide persistent repelling action when used as a spot treatment are also incorporated. Furthermore, in this specific embodiment there is an add functionality to repel dogs and other mid to large mammalian pets is included by the inclusion of rosemary oil EO, cinnamon oil EO, peppermint oil EO, lemongrass oil EO, castor oil and cottonseed oil.

Furthermore, in this specific embodiment there is an add functionality to repel dogs and other mid to large mammalian pets is included by the inclusion of rosemary oil EO, cinnamon oil EO, peppermint oil EO, lemongrass oil EO, castor oil and cottonseed oil.

Additionally, β-cyclodextrin is used for encapsulation of the essential oils. This serves multiple purposes including increasing overall effectiveness by reducing breakdown due to air and water exposure which works to increase shelf life and duration of efficacy when used as a surface treatment. Moreover, because this is a pet specific product, thyme oil and eugenol, in particular, are encapsulated at a higher rate to help reduce toxicity to dogs and other pets (this is in part due to pH interactions and characteristics of cyclodextrin host molecule entrapment and is functional in this product context due to the more alkaline pH level of canine saliva in contrast to the (comparable) more acidic amphibian and reptilian biologic systems. Furthermore, the utilization of lipid entrapment via micelles, biomolecular sheets and SLNP multiplicatively increases the efficacy of both the longevity of effectiveness and specificity of compound delivery while working to further reduce toxicity towards mammalian cells.

A kit, according to the invention, may provide one or more active ingredients and one or more inactive ingredients in the same or separate packaging. For example, the active and/or inactive ingredients could be in separate tubes, bottles, or other containers that are sold together, so that the contents can be admixed prior to use.

The kit may also include one or more delivery systems for active and/or inactive ingredients, such as, for example, a handheld sprayer (e.g., a trigger sprayer or an aerosol can) or a larger, domestic spray pack. Alternatively, the kit may include an absorbent support delivery system or automated delivery system as described above.

It is further envisaged that the present invention may be combined with other forms of pest amphibian control such as, for example, trapping, baiting, and other forms of poisoning.

The composition of the active ingredients and efficacy is actually determined using body mass—that is to say the while the EPA requires a minimum percent of active ingredient (by mass) to be disclosed on the product labeling (there by effectively 'locking' the product composition). However, the actual determination of the amount and ratio of thymol/eugenol, as well as the supporting active ingredients) is dose specific to the body mass of the amphibian/reptile. More specifically the current formulation has a set amount of thymol and eugenol that is is based on applying up to 6 sprays to a 4 lb. cane toad.

Just for clarity I actually determined a general range of the number of sprays one would typically apply and then backed into the amount of thymol and eugenol I would need taking the average of the tested lethal doses for 3.5-4.2 lbs. cane toads. Then using the 1.3 ml per trigger pull in the trigger sprayer we include, and the requisite amount of other ingredients and encapsulation and other mixing requirements I used a series of regression models to find the optimum balance of ingredients to trigger sprays that would coincide with the general number of sprays one would typically apply.

All of this is just to say that any specific product will always have the active ingredients expressed as percent by mass (unless the regulations change). But that number is something that is derived using the dose to body weight (in ml/K for the liquid state and mg/K for solid)—the amount of the active ingredient was and always will be based on the intended pest and its body mass.

Although a preferred embodiment of the method of the present invention has been described in the foregoing detailed description, it will be understood that the invention is not limited to the embodiment disclosed, but is capable of numerous rearrangements, modifications and substitutions without departing from the scope of the invention.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A method of killing an amphibian or reptile which comprises administering an effective amount of a composition which comprises encapsulated active ingredients consisting essentially of from about 5 to about 25% w/w of thymol or a derivative thereof, based upon the total weight of active ingredients, and from about 2.5 to about 20% w/w of eugenol or a derivative thereof, based upon the total weight of active ingredients, wherein the ratio of the weight amount of thymol or a derivative thereof to the weight of eugenol or a derivative thereof, independent of other ingredients, is in the range of from about 20:80 to about 80:20, and wherein the active ingredients are encapsulated in β-cyclodextrin.

2. The method of claim 1, wherein the composition consists essentially of (i) from about 10 to about 20% w/w of thymol or a derivative thereof, based upon the total weight of active ingredients, and (ii) from about 5 to about 15% w/w of eugenol or a derivative thereof, based upon the total weight of active ingredients.

3. The method of claim 1, wherein the composition also consists essentially of from about 0.5 to about 5% w/w of rosemary oil or a derivative thereof, based upon the total weight of active ingredients.

4. The method of claim 1, wherein the composition also consists essentially of from about 25 to about 75% w/w of castor oil or a derivative thereof, based upon the total weight of active ingredients.

5. The method of claim 1, wherein the composition also consists essentially of from about 5 to about 20% w/w of cottonseed oil or a derivative thereof, based upon the total weight of active ingredients.

6. The method of claim 1, wherein the composition also consists essentially of from about 0.5 to about 6.0% w/w of cinnamon oil or a derivative thereof, based upon the total weight of active ingredients.

7. The method of claim 1, wherein the composition also consists essentially of from about 0.5 to about 5% w/w of lemongrass oil or a derivative thereof, based upon the total weight of active ingredients.

8. The method of claim 1, wherein the composition also consists essentially of from about 0.5 to about 5% w/w of peppermint oil or a derivative thereof, based upon the total weight of active ingredients.

9. The method of claim 1, wherein the composition also consists essentially of one or more inactive ingredients selected from the group consisting of water, lecithins, urea, β-cyclodextrin, and isopropyl alcohol.

10. The method of claim 1, wherein the active ingredients are encapsulated separately or together.

11. The method of claim 1, wherein the amphibian or reptile is a cane toad.

* * * * *